Dec. 4, 1923.
H. E. ISKOW
SAFETY DEVICE
Filed Dec. 2, 1921
1,475,998
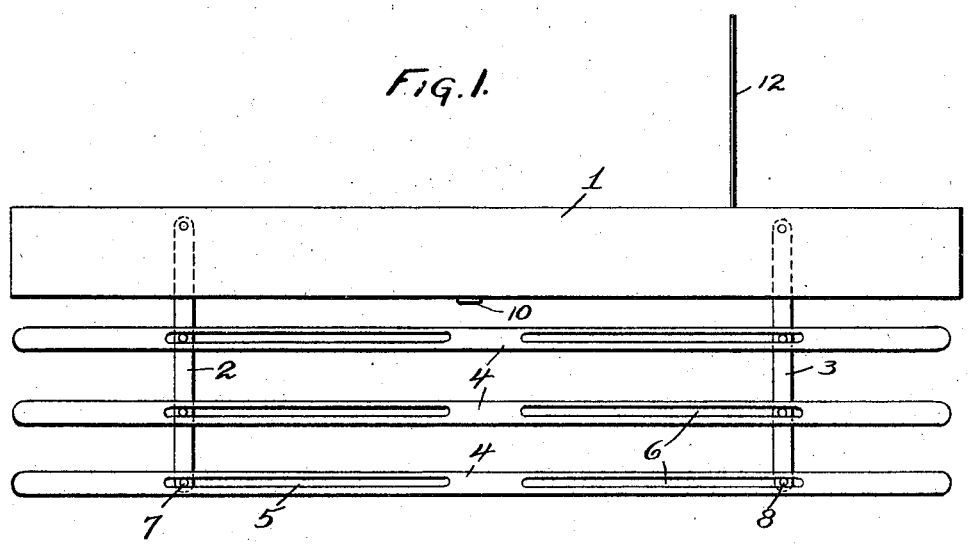
Fig. 1.
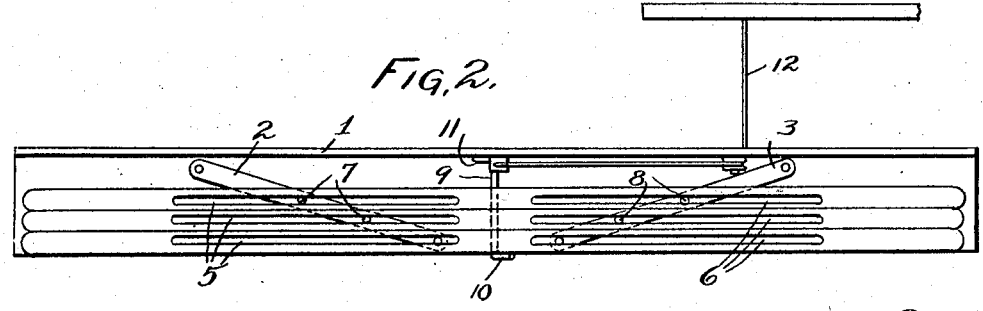
Fig. 2.
Fig. 3.
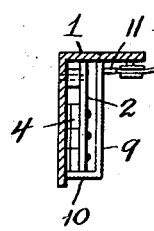
Harry E. Iskow
Inventor Patented Dec. 4, 1923.

1,475,998

UNITED STATES PATENT OFFICE.

HARRY E. ISKOW, OF DETROIT, MICHIGAN.

SAFETY DEVICE.

Application filed December 2, 1921. Serial No. 519,538.

*To all whom it may concern:*

Be it known that I, HARRY E. ISKOW, a subject of Denmark, residing at Detroit, in the county of Wayne and State of Michigan, have invented certain new and useful Improvements in a Safety Device, of which the following is a specification.

This invention relates to safety devices and more particularly to an improved fender for automobiles.

The primary object of the invention is to provide a collapsible fender which may be attached to the main fender of the automobile and which may be quickly thrown into operative position so that the operator may control the fender to prevent a person struck by the automobile from being injured by the automobile passing over him.

One of the objects of the invention is to provide a collapsible fender of this character which will be within the control of the operator of the vehicle so that any obstacle in the path of the vehicle may be deflected or caught up by the fender so that it can not pass beneath the vehicle.

Other objects of the invention will appear upon consideration of the following detail description and accompanying drawings, wherein:—

Figure 1 is a front elevation of the device constructed in accordance with my invention, showing it in operative position, Figure 2 is a longitudinal section through the fender showing the collapsible portion in inoperative position, Figure 3 is a detail view showing a cross section of the fender with the means for controlling the operation thereof.

Referring to the drawing by numerals, the main fender 1 is of the general construction now generally mounted on the front of an automobile and is of hollow interior, having its bottom open. Suspended from the fender on the interior thereof are two pivoted links 2 and 3 which project for any desired distance below the fender 1 according to the space desired to be covered by the barrier. A plurality of longitudinally extending barrier strips 4 are arranged in parallel relation and are adapted to be connected to the links 2 and 3.

Each barrier strip 4 is provided with a pair of longitudinal slots 5 and 6 and the links 2 and 3 are equipped with pins or bolts 7 and 8, the pins 7 passing through the longitudinal slots 5, and the pins 8 passing through the slot 6. The links as stated, are pivotally mounted in the main fender 1 and when they are swung up into the fender, the barrier 4 will be raised as shown in Fig. 2, the pins 7 and 8 sliding longitudinally through the slots 5 and 6 to cause the parallel barrier to be raised into contact with each other and thus form a compact arrangement within the fender.

An operating rod 9 is mounted intermediate the ends of the main fender and is provided with a hook end 10 which is adapted to engage the lowermost barrier 4 when the strips are assembled. A finger element 11 on the upper end of the rod 9 is adapted to be connected by a flexible cable 12 to a foot pedal 13 within the reach of the driver's foot so that pressure on the foot pedal will cause a pull to be exerted on the member 11 whereby the rod 10 will turn to disengage the hook from the lowermost barrier strip 4 thus permitting the strip to drop into the position shown in Fig. 1 of the drawing and thereby serve as an effective barrier and safety fender when the vehicle is about to strike an object in its path. With this arrangement any person or other object which gets into the path of the automobile will be prevented from passing under the automobile as the operator will immediately press upon the foot pedal and cause the barrier strip to drop to operative position.

Minor changes may be made in the details of construction without departing from the spirit of the invention or the scope of the claim hereunto appended.

What is claimed is:—

In combination with a main fender of a vehicle a pair of links suspended from the interior of the fender and adapted to hang by gravity from the fender for some distance below the fender, each link being provided with pins, a plurality of barrier strips having longitudinal slots to receive the said pins, the said strips being arranged in parallel relation and equal in length to the approximate length of the fender and adapted to be closely associated within the fender when the links are swung inwardly thereof, and manually operated means to normally maintain the links within the fender and to permit them to drop when the said means is actuated.

In testimony whereof, I have affixed my signature in the presence of two witnesses.

HARRY E. ISKOW.

Witnesses:
JACK S. NIELSEN,
HENRY J. ROMMEL.